(12) United States Patent
Lim et al.

(10) Patent No.: US 10,283,755 B2
(45) Date of Patent: May 7, 2019

(54) BATTERY MODULE

(71) Applicants: HYUNDAI MOTOR COMPANY, Seoul (KR); KIA MOTORS CORPORATION, Seoul (KR)

(72) Inventors: Hae Kyu Lim, Bucheon-si (KR); Yong Hwan Choi, Yongin-si (KR); Yoon Cheol Jeon, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 303 days.

(21) Appl. No.: 14/959,965

(22) Filed: Dec. 4, 2015

(65) Prior Publication Data

US 2017/0025664 A1  Jan. 26, 2017

(30) Foreign Application Priority Data

Jul. 20, 2015 (KR) .................. 10-2015-0102283

(51) Int. Cl.
| | |
|---|---|
| *H01M 2/34* | (2006.01) |
| *H01M 2/20* | (2006.01) |
| *H01M 10/48* | (2006.01) |
| *H01M 2/12* | (2006.01) |
| *H01M 2/10* | (2006.01) |
| *H01M 10/647* | (2014.01) |
| *H01M 10/6557* | (2014.01) |

(Continued)

(52) U.S. Cl.
CPC ........... *H01M 2/34* (2013.01); *H01M 2/1077* (2013.01); *H01M 2/1223* (2013.01); *H01M 2/1264* (2013.01); *H01M 10/482* (2013.01); *H01M 10/647* (2015.04); *H01M 10/6557* (2015.04); *H01M 2/06* (2013.01); *H01M 2/08* (2013.01); *H01M 2200/103* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 6,551,741 B1 * | 4/2003 | Hamada | H01M 2/0242 429/151 |
| 2007/0236177 A1 * | 10/2007 | Phillips | H01M 2/0202 320/115 |
| 2012/0177970 A1 | 7/2012 | Marchio et al. | |

(Continued)

FOREIGN PATENT DOCUMENTS

| | | |
|---|---|---|
| EP | 2806494 A1 | 11/2014 |
| JP | 2014-216248 A | 11/2014 |

(Continued)

*Primary Examiner* — Jonathan G Leong
*Assistant Examiner* — Christopher P Domone
(74) *Attorney, Agent, or Firm* — Morgan Lewis & Bockius LLP

(57) ABSTRACT

A battery module includes a cell assembly comprising a plurality of cells; a module housing including an upper housing having a closed inner space accommodating the cell assembly and a lower housing air-tightly attached to a lower end of the upper housing; and an air vent member air-tightly disposed at one side of the module housing to discharge inner gas of the module housing to the outside, the air vent member being configured to block external gas from entering into the module housing.

7 Claims, 4 Drawing Sheets

(51) Int. Cl.
*H01M 2/06* (2006.01)
*H01M 2/08* (2006.01)

(56) References Cited

U.S. PATENT DOCUMENTS

2014/0023894 A1   1/2014  Jansen et al.
2014/0134462 A1*  5/2014  Choi ................... B60L 11/1874
                                                      429/7

FOREIGN PATENT DOCUMENTS

| KR | 10-2011-0124264 A | | 11/2011 |
|----|-------------------|---|---------|
| KR | 10-2011-0133256 A | | 12/2011 |
| KR | 10-2012-0007019 A | | 1/2012 |
| KR | 10-2014-0015859 A | | 2/2014 |
| KR | 1020140015859 | * | 2/2014 |
| KR | 10-2014-0085890 A | | 7/2014 |
| KR | 10-2014-0128846 A | | 11/2014 |
| WO | 2012002907 A1 | | 1/2012 |

* cited by examiner

BATTERY MODULE

CROSS-REFERENCE TO RELATED APPLICATION

This application claims under 35 U.S.C. § 119(a) the benefit of priority to Korean Patent Application No. 10-2015-0102283, filed on Jul. 20, 2015, the entirety of which is incorporated herein by reference.

TECHNICAL FIELD

The present disclosure relates to a battery module for securing a sealing property. More particularly, it relates to a battery module for securing an air-tight venting structure which may discharge gas in the battery module and a sealing structure which blocks moisture from outside from flowing therein.

BACKGROUND

In an eco-friendly vehicle which uses an electric motor as a driving source, such as an electric vehicle, a hybrid vehicle, or a fuel cell vehicle, a battery pack which supplies power to an electric motor is mounted as a power supply. Generally, pouch type cells are connected in series to form a battery module and a plurality of battery modules are connected in series to form a battery pack.

A vehicle-mounted battery pack requires a venting structure, which collects and discharges internal gas in the unit of the battery module, and a sealing structure which prevents moisture from outside from entering therein, preventing harmful gas generated therein from cohering and preventing a high voltage insulation problem due to the inflow of external moisture.

In order to minimize the danger caused by the discharge of harmful gas due to an accident or failure of the vehicle, it is necessary to safely discharge the harmful gas to the atmosphere. This also prevents the harmful gas from leaking into the vehicle. Thus, a gas venting structure and a moisture sealing structure are implemented in the unit of battery module of the vehicle-mounted battery pack, thereby improving reliability and stability.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art and to provide a battery module having a venting structure which may discharge gas generated in the battery module and a sealing structure which blocks moisture from the outside from flowing therein.

In one aspect, the present disclosure provides a battery module comprising a cell assembly comprising a plurality of cells; a module housing including an upper housing having a closed inner space accommodating the cell assembly and a lower housing air-tightly attached to a lower end of the upper housing; and an air vent member air-tightly disposed at one side of the module housing to discharge inner gas of the module housing to the outside, the air vent member being configured to block external gas from entering into the module housing.

In one embodiment, the cell assembly may include a first bus bar and a second bus bar which transmit power output from the plurality of cells to the outside, and a first terminal and a second terminal which air-tightly pass through one side of the module housing and are electrically connected to the first bus bar and the second bus bar, respectively, the first terminal and the second terminal each including a sealing rubber integrally formed at an outer side.

In one embodiment, in the upper housing, a plurality of cell covers which maintain a cell surface pressure of the cell assembly disposed in the inner space may be integrally molded.

In one embodiment, in the upper housing, a plurality of cell covers which maintain a cell surface pressure of the cell assembly disposed in the inner space may be integrally formed and one of the plurality of cell covers located at an inner side of the upper housing may have a cooling channel through which a cooling fluid for cooling a cell flows.

In one embodiment, a first end of the cell cover having the cooling channel may protrude to a lower side of the upper housing, and be air-tightly connected to a fluid outlet formed in the lower housing, and a second end of the cell cover having the cooling channel may be integrally connected to a fluid inlet formed at an upper end surface of the upper housing.

In one embodiment, the lower housing may include a guide rib on an inner surface, the guide rib being configured to support the ends of the cell covers inserted into the fluid outlet.

In one embodiment, the battery module may further comprise a voltage sensing module configured to sense a cell voltage and electrically connected to a terminal of one of the outermost cells among the plurality of cells.

In one embodiment, the voltage sensing module may be electrically connected to a voltage sensing fuse box through a connector, and the connector and the voltage sensing fuse box may be disposed on the outside of the module housing.

According to one embodiment of the present invention, gas generated when gas is generated in the vehicle in the unit of battery module may be air-tightly discharged and moisture from outside may be prevented from flowing therein, so that a high voltage insulation problem of the battery cell due to external humidity may be improved.

Other aspects and embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the inventive concept are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
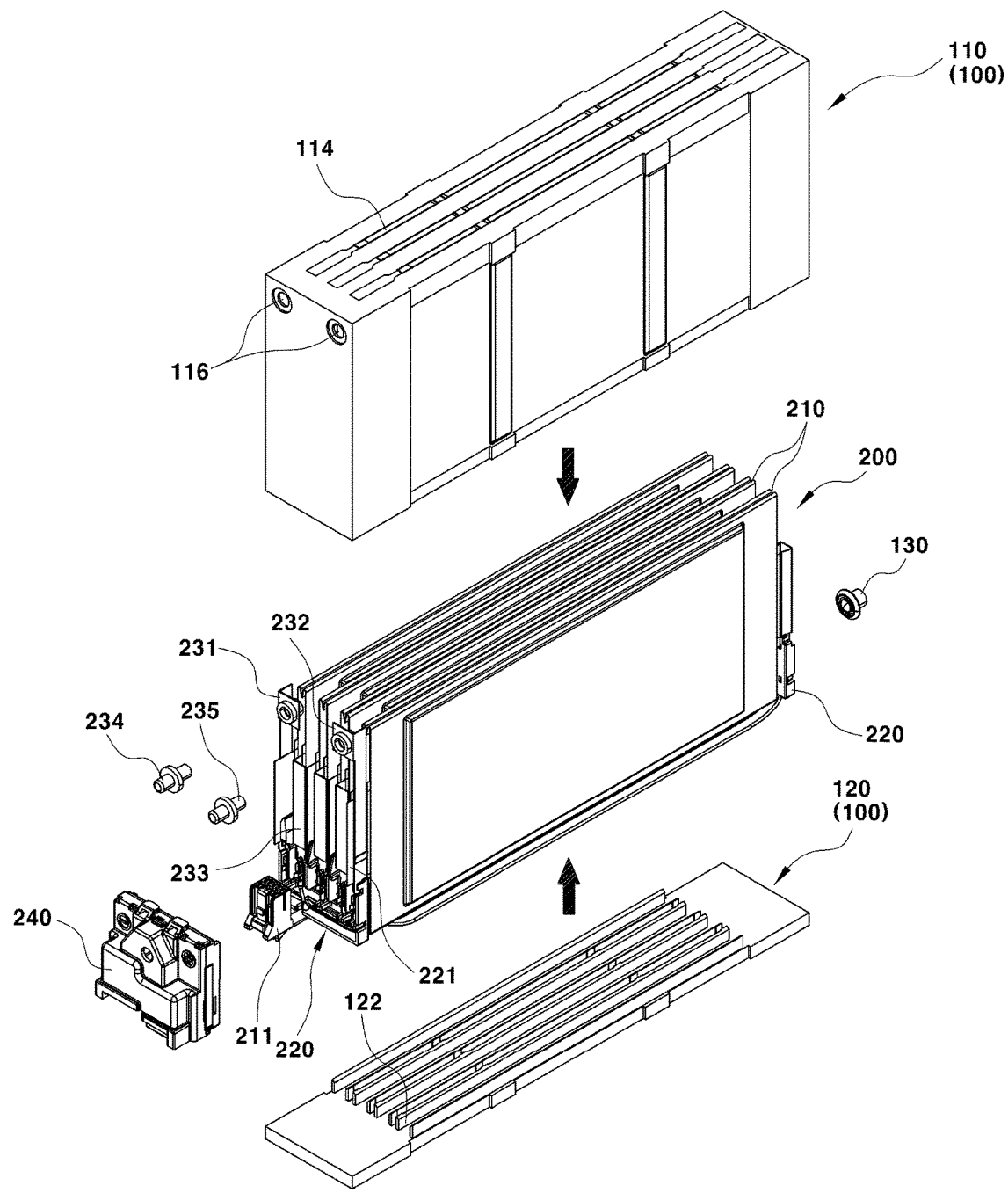
FIGS. 1 and 2 are exploded perspective views illustrating a battery module according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present inventive concept will be described more fully hereinafter with reference to the accompanying drawings, in which exemplary embodiments of the invention are shown so that those skilled in the art easily carry out the exemplary embodiment of the present invention.

Figure 2:
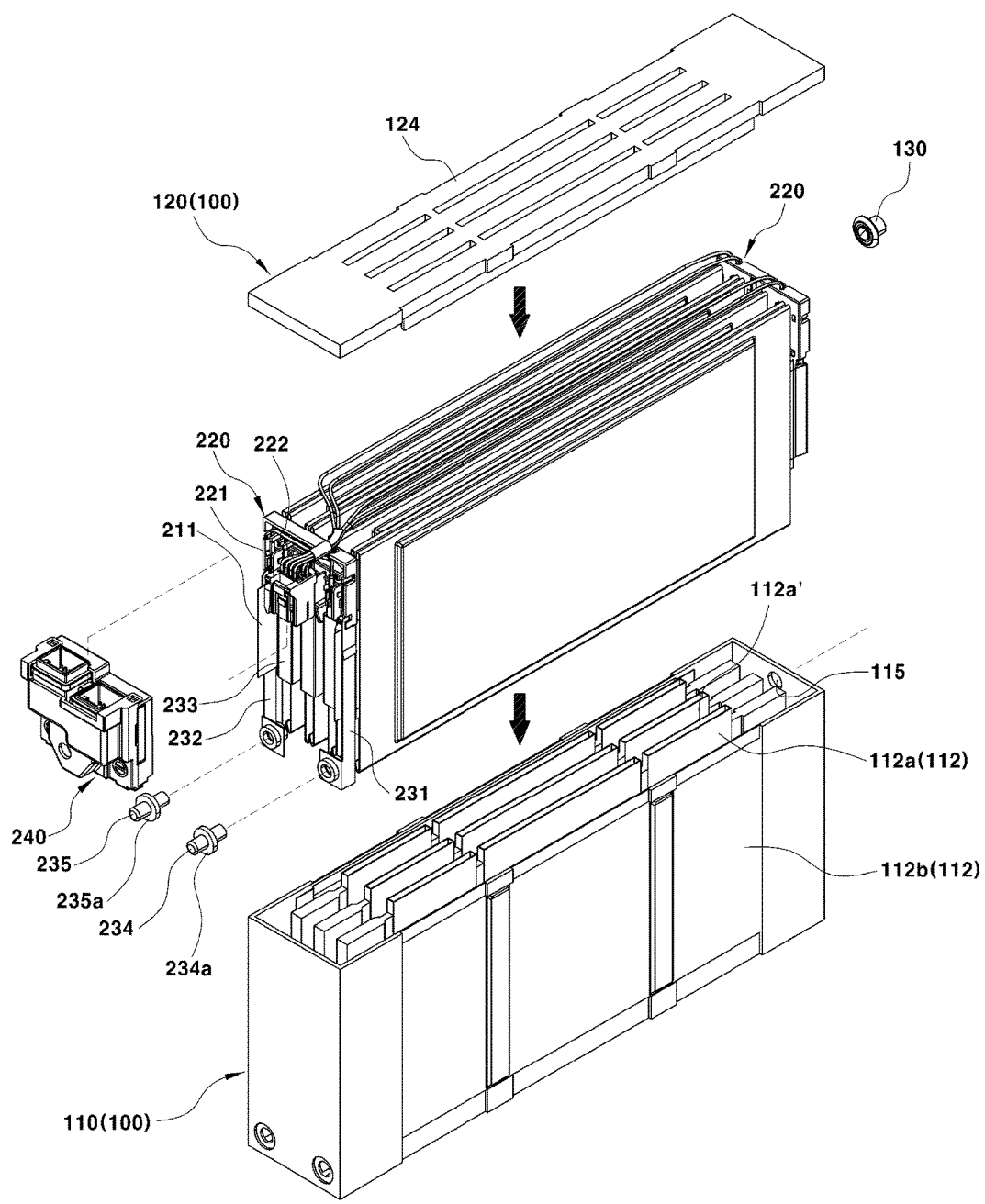
Figure 3:
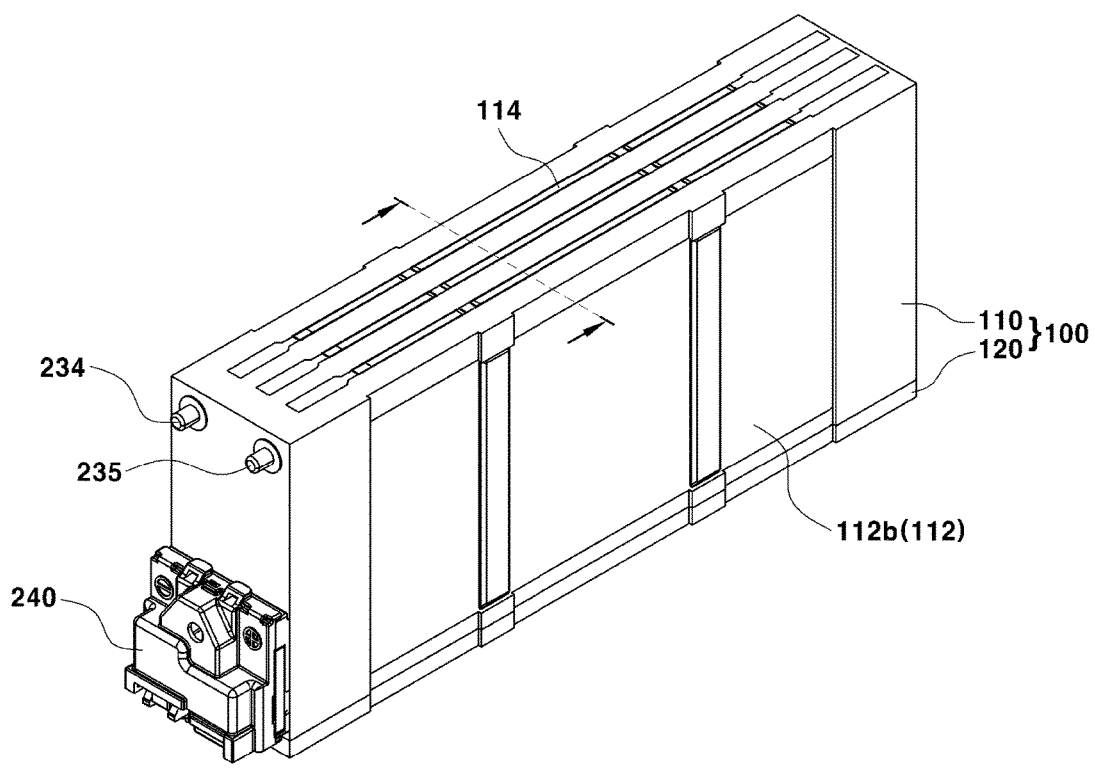
FIG. 3 is a combined perspective view illustrating a battery module according to an exemplary embodiment of the present invention.

A battery module according to an exemplary embodiment of the present invention has a venting structure which discharges gas from a battery module and a sealing structure which prevents external moisture from entering therein. As illustrated in FIGS. 1 to 3, the battery module includes a module housing 100, a cell assembly 200 which is accommodated in the module housing 100, and an air vent member 130 which is provided at one side of the module housing 100.

The module housing 100 is configured to include an upper housing 110 which has a closed inner space accommodating the cell assembly 200 and a lower housing 120 which is air-tightly attached to a lower end of the upper housing 110 and includes a plurality of cell covers 112 which are integrally formed with the upper housing 110 when the upper housing 110 is molded.

The cell covers 112 are integrally molded with the upper housing 110 by applying an insert molding method when the upper housing 110 is injection-molded. An example of the cell cover is a cell cover which is formed of an aluminum material.

Among the plurality of cell covers 112, an inner cell cover 112a which is located in the upper housing 110 has a cooling channel 112a' through which a cooling fluid for cooling the cell 210, which is disposed between the cell covers 112, flows and a side cell cover 112b which is integrally formed on front and rear side walls of the upper housing 110 has a plate-shaped structure in which the cooling channel is omitted.

Figure 4:
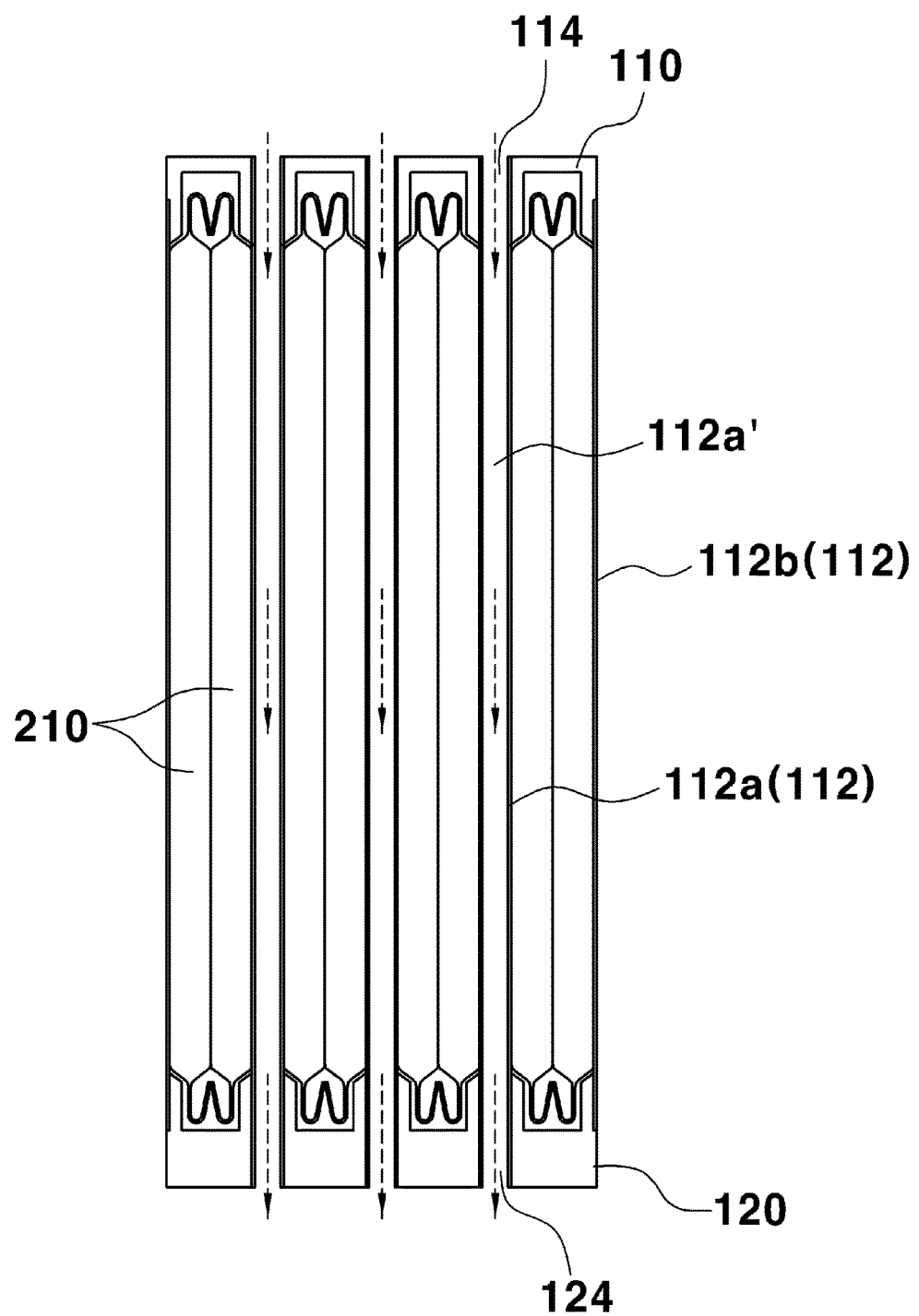
FIG. 4 is a cross-sectional view taken along line A-A of FIG. 3.

One end of the inner cell cover 112a having the cooling channel 112a' integrally continues to a fluid inlet 114 which is formed on an upper surface of the upper housing 110, and the other end thereof protrudes outside the lower end of the upper housing 110. When the upper housing 110 and the lower housing 120 are welded (for example, using laser, ultrasound wave, or heat), the other end of the inner cell cover 112a is assembled to be air-tightly inserted in a fluid outlet 124 which is formed on the lower housing 120 (see FIG. 4).

In this case, the inner cell cover 112a which is assembled in the fluid outlet 124 may be coated with sealer from the outside of the module housing 100 in order to secure an air-tightness with the fluid outlet 124.

Here, reference numeral 122 denotes a guide rib 122 which supports the inner cell cover 112a which is inserted in the fluid outlet 124. That is, the lower housing 120 has the guide rib 122 on an inner surface (a surface which is opposite to the upper housing 110) to support an end of the inner cell cover 112a which is inserted in the fluid outlet 124.

As illustrated in FIGS. 1 to 4, the cell assembly 200 has an assembly structure in which a plurality of pouch type battery cells 210 are arranged in a row and the plurality of battery cells 210 are located to be disposed between the cell covers 112 when the battery cells are inserted in the inner space of the upper housing 110 to be supported by a surface pressure and cooled by the cooling fluid which flows in the cooling channel 112a' of the inner cell cover 112a.

That is, both side surfaces of each of the plurality of cells 210 accommodated in the module housing 100 are supported by adjacent cell covers 112 to maintain a predetermined surface pressure, and the cells are cooled by the cooling fluid which flows in the cooling channel 112a' of the cell cover 112 which connects between the fluid inlet 114 and the fluid outlet 124 of the module housing 100.

In this case, in order to secure uniform cooling performance, generally, two cells 210 are inserted between adjacent cell covers 112.

In the cell assembly 200, the plurality of cells 210 is connected in series by a cell tab 233. A first bus bar 231 and a second bus bar 232 which transmit power (that is, power output from the plurality of cells) from the cell assembly 200 to the outside are electrically connected to a terminal 211 of an outermost cell among the plurality of cells 210.

One of the first bus bar 231 and the second bus bar 232 is connected to a negative terminal of the cell assembly 200 and the other one is connected to a positive terminal of the cell assembly 200.

The first bus bar 231 and the second bus bar 232 are electrically connected to a first terminal 234 and a second terminal 235 respectively. The first terminal 234 and the second terminal 235 pass through one side of the module housing 100 and for this purpose, terminal through holes 116 through which the first and second terminals air-tightly pass are provided at one side of the upper housing 110.

The first and second terminals 234 and 235 are provided to supply the power of the cell assembly 200 to the outside. The first and second terminals 234 and 235 have sealing rubbers 234a and 235a respectively which are integrally formed on outer circumferences and air-tightly pass through the terminal through hole 116 of the upper housing 110 by the sealing rubbers 234a and 235a to be connected with the first and second bus bars 231 and 232.

Here, the bus bars 231 and 232 and the terminals 234 and 235 are configured to be engaged with each other. For example, the first and second bus bars 231 and 232 have a nut-shaped structure at one side and the first and second terminals 234 and 235 have a bolt-shaped structure at one end of the one side.

The cell assembly 200 may include a voltage sensing module 220 to sense a cell voltage and the voltage sensing module 220 may be electrically connected to a terminal 211 of the outermost cell.

The voltage sensing module 220 is electrically connected to a voltage sensing fuse box 240 through a connector 221 and the connector 221 and the voltage sensing fuse box 240 are attached onto the outside of the module housing 100.

In this case, in order to secure the air-tightness of the module housing 100, a structure such as a groove (not illustrated) through which a wire 222 connected between the voltage sensing module 220 and the connector 221 passes is formed at a bonding portion of the upper housing 110 and the lower housing 120, and a sealer is applied between the wire 222, which passes between the upper housing 110 and the lower housing 120, and the module housing 100.

For reference, the voltage sensing fuse box 240 is provided to selectively block the power of the battery module from being output to the outside (for example, an electric field load) so that the voltage sensing fuse box 240 is configured to block the power flow by a control signal which is input from a control unit (not illustrated) provided at the outside of the battery module.

An air vent member 130 which discharges the inner gas of the module housing 100 to the outside is air-tightly provided at one side of the upper housing 110.

As the air vent member 130, a normal uni-directional air vent which discharges the inner gas of the module housing 100 to the outside, but blocks external gas from entering into the module housing 100 is used. In order to secure the air-tightness, an integrated sealing rubber may be provided at the outside of the air vent member or a sealer may be applied between an air vent mounting hole 115 and the air vent member 130 of the upper housing 110.

The air vent member 130 may discharge the gas in the module housing 100 through the air vent member 130 to the outside by a pressure difference from the outside when a pressure is increased by gas generated in the module housing 100 due to erroneous behavior of the cells 210.

The battery module according to the exemplary embodiment of the present invention with the above-described configuration is configured to secure the air-tightness in the unit of module and also discharge the gas generated in the module housing, so that external moisture is prevented from flowing therein to secure a high voltage insulating performance with respect to the external moisture and secure reliability and stability of the battery system. Further, a gas venting structure for the battery module unit of the pouch type cell is implemented to discharge the gas generated in the battery module to the outside of the module housing, thereby satisfying regulations related to gas venting.

The inventive concept has been described in detail with reference to multiple embodiments thereof. However, it will be appreciated by those skilled in the art that changes may be made in these embodiments without departing from the principles and spirit of the invention, the scope of which is defined in the appended claims and their equivalents.

What is claimed is:

1. A battery module, comprising:
a cell assembly comprising a plurality of cells;
a module housing including an upper housing having a closed inner space accommodating the cell assembly and a lower housing air-tightly attached to a lower end of the upper housing; and
an air vent member air-tightly disposed at one side of the module housing to discharge inner gas of the module housing to the outside, the air vent member being configured to block external gas from entering into the module housing,
wherein a plurality of cell covers which maintain a predetermined cell surface pressure of the cell assembly disposed in the inner space are integrally formed with the upper housing and the plurality of cell covers located at an inner side of the upper housing have a plurality of cooling channels through which a cooling fluid for cooling a cell flows,
wherein both side surfaces of each of the plurality of cells are supported by adjacent cell covers to maintain the predetermined cell surface pressure, and the side surfaces of the cells are cooled by the cooling fluid which flows in the cooling channels.

2. The battery module of claim 1, wherein the cell assembly includes a first bus bar and a second bus bar which transmit power output from the plurality of cells to the outside, and a first terminal and a second terminal which air-tightly pass through one side of the module housing and are electrically connected to the first bus bar and the second bus bar, respectively, the first terminal and the second terminal each including a sealing rubber integrally formed at an outer side.

3. The battery module of claim 1, wherein the plurality of cell covers which maintain the predetermined cell surface pressure of the cell assembly disposed in the inner space are integrally molded with the upper housing.

4. The battery module of claim 1, wherein a first end of the cell cover having the cooling channel protrudes to a lower side of the upper housing, and is air-tightly connected to a fluid outlet formed in the lower housing, and a second end of the cell cover having the cooling channel is integrally connected to a fluid inlet formed at an upper end surface of the upper housing.

5. The battery module of claim 4, wherein the lower housing includes a guide rib on an inner surface, the guide rib being configured to support the ends of the cell covers inserted into the fluid outlet.

6. The battery module of claim 1, further comprising a voltage sensing module configured to sense a cell voltage and electrically connected to a terminal of one of the outermost cells among the plurality of cells.

7. The battery module of claim 6, wherein the voltage sensing module is electrically connected to a voltage sensing fuse box through a connector, and the connector and the voltage sensing fuse box are disposed on the outside of the module housing.

* * * * *